United States Patent
Gervautz et al.

(10) Patent No.: US 10,109,065 B2
(45) Date of Patent: Oct. 23, 2018

(54) USING OCCLUSIONS TO DETECT AND TRACK THREE-DIMENSIONAL OBJECTS

(75) Inventors: Michael Gervautz, Vienna (AT); Roy Lawrence Ashok Inigo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 13/013,535

(22) Filed: Jan. 25, 2011

(65) Prior Publication Data

US 2012/0188342 A1   Jul. 26, 2012

(51) Int. Cl.
*H04N 13/02*   (2006.01)
*G06T 7/246*   (2017.01)
*G06T 7/73*    (2017.01)

(52) U.S. Cl.
CPC ............... *G06T 7/246* (2017.01); *G06T 7/73* (2017.01); *G06T 2207/10016* (2013.01); *G06T 2207/30208* (2013.01); *G06T 2207/30244* (2013.01)

(58) Field of Classification Search
CPC ......... G06T 7/0042; G06T 2207/10016; G06T 2207/20144; G06T 2207/30204; G06T 2207/30244
USPC .......................................................... 348/46
See application file for complete search history.

(56) References Cited

U.S. PATENT DOCUMENTS

| | | | |
|---|---|---|---|
| 7,643,024 | B2 | 1/2010 | Bell et al. |
| 2008/0137940 | A1 | 6/2008 | Kakinami et al. |
| 2009/0175527 | A1 | 7/2009 | Agliozzo et al. |
| 2010/0045448 | A1 | 2/2010 | Kakinami |

FOREIGN PATENT DOCUMENTS

| | | |
|---|---|---|
| CN | 101710429 A | 5/2010 |
| JP | 2006059165 A | 3/2006 |
| JP | 2008046750 A | 2/2008 |

OTHER PUBLICATIONS

Gun A. Lee et al., "Occlusion based interaction methods f o r tangible augmented reality environments", Proceedings of the 2004 Acm Siggraph International Conference on Virtual Reality Continuum and its Applications in Industry VRCAI '04, Jan. 1, 2004 (Jan. 1, 2004), p. 419, XP55005457, 1 New York, New York, USA DOI: 10.1145/1044588.1044680. ISBN: 978-1-58-0113884-9 .
Hiroshilshii et al., "Emerging Frameworks f o r Tangible User Interfaces", Feb. 1, 2001 (Feb. 8, 2001), XP002674993, Retrieved from the Internet: URL:http://web.media.mit.edu/-ullmer/paper s/tui-millenium-chapter.pdf [retrieved on Apr. 27, 2012].

(Continued)

*Primary Examiner* — Nguyen Truong
(74) *Attorney, Agent, or Firm* — Kilpatrick Townsend & Stockton (57) ABSTRACT

A mobile platform detects and tracks a three-dimensional (3D) object using occlusions of a two-dimensional (2D) surface. To detect and track the 3D object, an image of the 2D surface with the 3D object is captured and displayed and the 2D surface is detected and tracked. Occlusion of a region assigned as an area of interest on the 2D surface is detected. The shape of the 3D object is determined based on a predefined shape or by using the shape of the area of the 2D surface that is occluded along with the position of the camera with respect to the 2D to calculate the shape. Any desired action with respect to the position of the 3D object on the 2D surface may be performed, such as rendering and displaying a graphical object on or near the displayed 3D object.

31 Claims, 5 Drawing Sheets

(56) References Cited

OTHER PUBLICATIONS

International Search Report and Written Opinion—PCT/US2012/022479—ISA/EPO—dated May 10, 2012.

Iwata T et al., "Traditional games meet ICT: A case study on go game augmentation", Tei ' 10—Proceedings of the 4th International Conference on Tangible, Embedded, and Embodied Interaction 2010 Association for Computing Machin, 2010, pp. 237-240, XP002674992, DOI: D01:10.1145/1709886.1709933 .

Kim S et al: "Using keyboards with head mounted d i spl ays", Proceedings VRCAI 2004—Acm Siggraph International Conference on Virtual Reality Continuum and its Applications in Industry—Proceedings VRCAI 2004—Acm Siggraph International Conference on Virtual Reality Continuum and its Applications in Indust, 2004, pp. 336-343, XP002674991, sections 3,4,6 figures 4,11,16.

McDonald et al., "Replacing a Mouse with Hand Gesture i n a Plane-Based Augmented Reality System", Proceedings of 16th International Conference on Vision Interface, Jun. 11, 2003 (Jun. 11, 2003), XP002674990, Halifax, Nova Scotia, Canada sections 1-3.

M. Hebert et al., "Detecting & Using Object Boundaries", Website: http://www.cs.cmu.edu/~stein/nsf_webpage/, Date Accessed: Oct. 4, 2010, 10 pages.

Wang J-B,"Scene-Planning System Based on Augmented Reality Technique," Journal of Image and Graphics, Apr. 30, 2002, vol. 7(4), pp. 405-410.

Fig. 8 ated and tracked. Occlusion of a region assigned as an area of interest on the 2D surface is detected. The shape of the 3D object is determined based on a predefined shape or by using the shape of the area of the 2D surface that is occluded along with the position of the mobile platform with respect to the 2D surface to calculate the shape. Any desired action with respect to the position of the 3D object on the 2D surface may be performed, such as rendering and displaying a graphical object on or near the displayed 3D object based on the location of the area of interest of the 2D surface and the shape of the 3D object.

USING OCCLUSIONS TO DETECT AND TRACK THREE-DIMENSIONAL OBJECTS

BACKGROUND

In augmented reality (AR) applications, a real world object is imaged and displayed on a screen along with computer generated information, such as an image or textual information. In AR, the imaged real world objects are detected and tracked in order to determine the camera's position and orientation (pose) information relative to the object. This information is used to correctly render the graphical object to be displayed along with the real world object. The real world objects that are detected and tracked are generally two-dimensional (2D) objects. Detecting and tracking three-dimensional (3D) objects is algorithmically more complex and computationally very expensive compared to detecting and tracking 2D surfaces. On a desktop computer, full 3D tracking is typically performed by recognizing the entire 3D object from the object's geometry. Due to the limited processing power on mobile platforms, such as smart phones, there is no full 3D object tracking solution for mobile platforms. However, 3D object detection & tracking remains an important objective in AR applications in order to build compelling user experiences around 3D objects in the real world and not just 2D images or planes. Thus, what is needed is an improved way to detect and track 3D objects.

SUMMARY

A mobile platform detects and tracks a 3D object using the 3D objects occlusion of a 2D surface. To detect and track the 3D object, an image of the 2D surface with the 3D object is captured and displayed and the position of the mobile platform with respect to the 2D surface is detected and tracked. Occlusion of a region assigned as an area of interest on the 2D surface is detected. The shape of the 3D object is determined based on a predefined shape or by using the shape of the area of the 2D surface that is occluded along with the position of the mobile platform with respect to the 2D surface to calculate the shape. Any desired action with respect to the position of the 3D object on the 2D surface may be performed, such as rendering and displaying a graphical object on or near the displayed 3D object based on the location of the area of interest of the 2D surface and the shape of the 3D object.

DETAILED DESCRIPTION

Figure 1A:
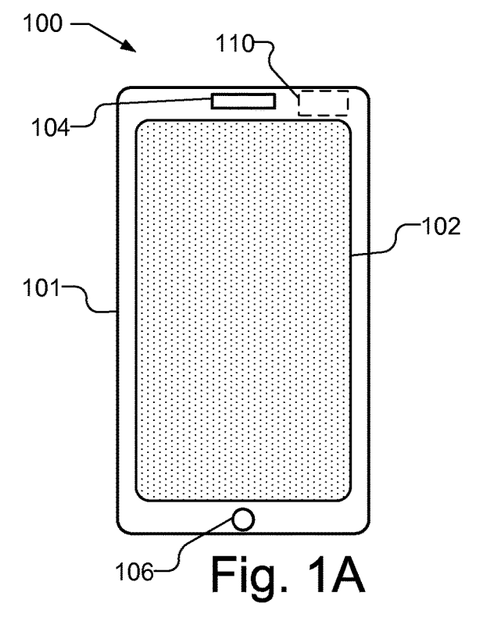
FIGS. 1A and 1B illustrate a front side and back side, respectively, of a mobile platform capable of detecting and tracking a 3D object using the occlusion of a 2D surface.
Figure 1B:
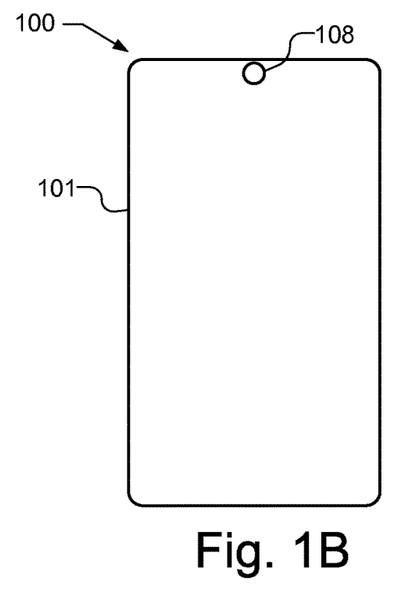

FIGS. 1A and 1B illustrate a front side and back side, respectively, of a mobile platform 100 capable of detecting and tracking 3D objects using occlusions of a 2D surface. The mobile platform 100 in FIGS. 1A and 1B is illustrated as including a housing 101, a display 102, which may be a touch screen display. The mobile platform 100 may also include a speaker 104 and microphone 106, e.g., if the mobile platform 100 is a cellular telephone. The mobile platform 100 further includes a forward facing camera 108 to image the environment, which is displayed on display 102. The mobile platform 100 may further include motion sensors 110, such as accelerometers, gyroscopes or the like, which may be used to assist in determining the pose of the mobile platform 100 or equivalently the camera 108, which may have a known/calibrated position relationship to the motion sensors 110. The pose of the mobile platform 100 may also or alternatively be determined using vision based tracking techniques. It should be understood that the mobile platform 100 may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of augmented reality (AR).

Figure 2:
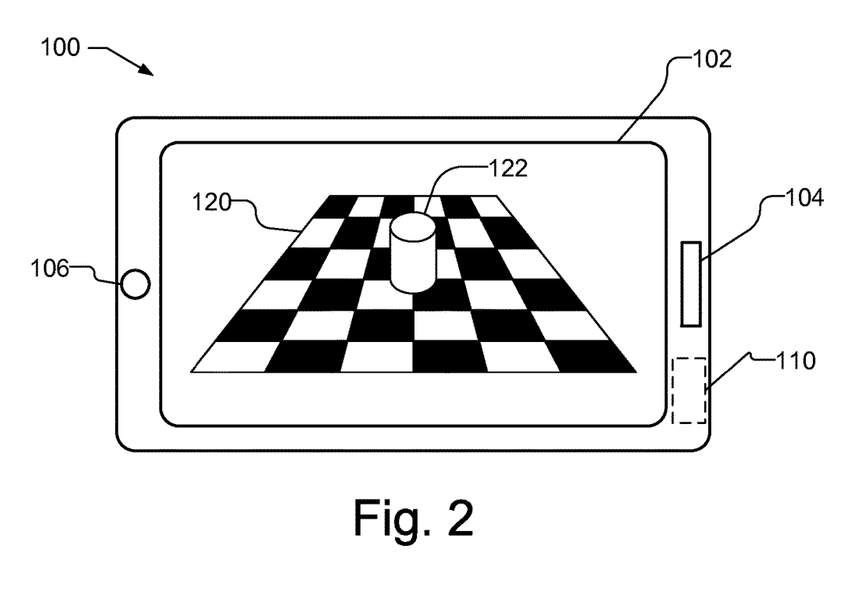
FIG. 2 illustrates a front side of the mobile platform held in landscape mode displaying a captured image of a 2D checkered surface and a 3D tubular object.

FIG. 2 illustrates a front side of the mobile platform 100 held in landscape mode. The display 102 is illustrated as displaying an image of a real-world 2D checkered surface 120 with a real-world 3D tubular object 122 over the surface 120. If desired, computer rendered graphical objects may be displayed by the display 102 as well. The real world objects are produced using camera 108 (FIG. 1B), while any AR objects are computer rendered objects (or information). Mobile platform 100 detects and tracks the 3D object 122 based on the occlusion of the 2D surface 120 at a known location and a determined shape of the 3D object. Consequently, mobile platform 100 is not required to detect and track the 3D object directly, thereby improving computational efficiency, which translates to improved frame rates and battery usage.

Figure 3:
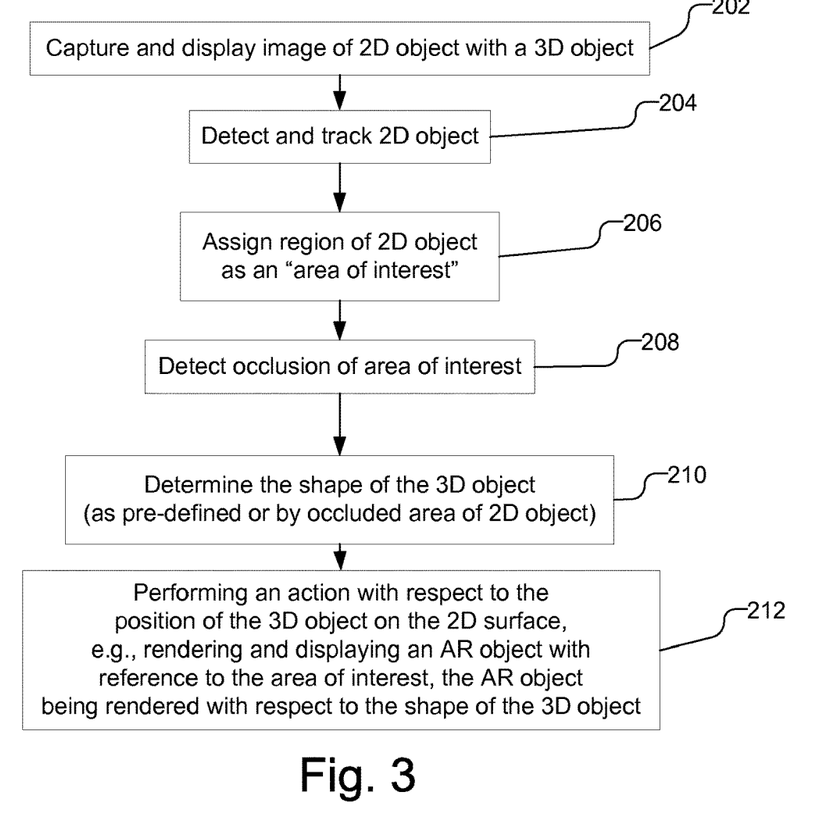
FIG. 3 is a flow chart of detecting and tracking a 3D object using occlusions of a 2D surface with the mobile platform.

FIG. 3 is a flow chart of detecting and tracking a 3D object using occlusions of a 2D surface. As illustrated, an image of a 2D surface with a 3D object is captured and displayed (202). It should be understood that a captured image may be a single image, e.g., photograph or frame of video, or if desired more than one photograph or frame of video may be used to generate the single image. The position of the mobile platform is with respect to the 2D surface is detected and tracked (204). For example, the position of the mobile platform 100 with respect to the 2D checkered surface 120 illustrated in FIG. 2 is detected and tracked. Detecting and tracking the position of the mobile platform with respect to the 2D surface may be performed using well known vision based tracking, where features from additional images from the camera 108 are extracted and compared to extracted features from the image of the 2D surface. Alternatively, if desired, the relationship between the mobile platform and the 2D surface may be determined based on a known pose of the 2D surface in the real-world and the pose of the mobile platform, which is determined using motion sensors 110.

Figure 4:
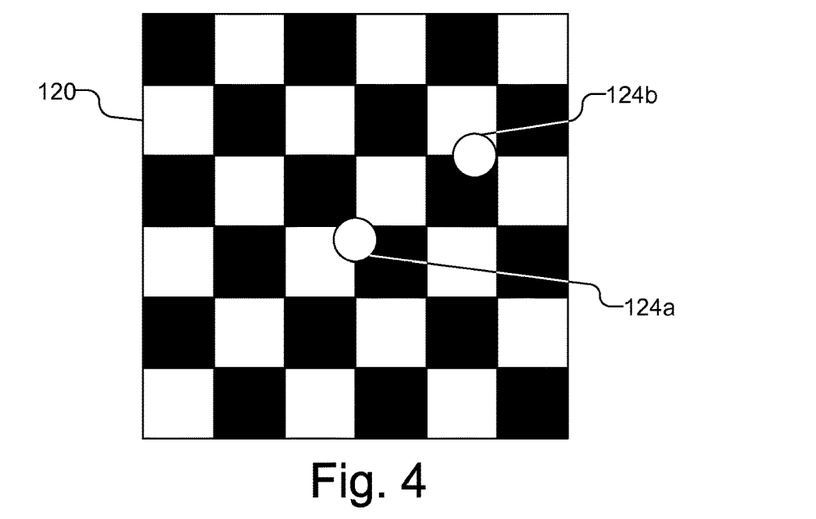
FIG. 4 illustrates a top plan view of the imaged 2D checkered surface with two regions assigned as "areas of interest".

A specific region of the 2D surface, i.e., a region with a known location, is assigned as an "area of interest" (206). The area of interest is a region that is expected to be occluded by the 3D object. The assignment of the area of interest may be performed, e.g., by the user while viewing the 2D surface through display 102 using a graphical user interface on the mobile platform 100. Alternatively, the assignment of the area of interest may be performed off-line and stored in memory of the mobile platform 100. If desired, the entire 2D surface or only a small region of the 2D surface may be assigned as the area of interest. One or more regions may be assigned as an area of interest within the same 2D surface. These areas of interest can be common geometric shapes such as a square, rectangle, triangle, circle, etc. or any polygon covering a specific area within the 2D image. For example, the shape of the area of interest as well as the location of the area of interest may be based on a predefined shape and location of the 3D object. FIG. 4, by way of example, illustrates a top plan view of the imaged 2D checkered surface 120 with two regions 124a and 124b having known locations assigned as "areas of interest". The regions 124a and 124b are illustrated as circular, as the expected 3D object 122 in this example, has a tubular shape, and thus a circular cross-section. If desired, many more areas of interest may be assigned. Additionally, if desired, the area of interest may have a shape that is different than the cross-sectional shape of the 3D object.

The process then detects when the area of interest is occluded, i.e., covered (208). The occlusion may be detected by performing natural feature detection and matching using a number of features in the area of interest and identifying when a significant portion of features in the area or interest, i.e., a number greater than a predetermined threshold, are not detected while the area of interest is in the view of the camera 108. Features may be detected and matched as part of a vision based tracking technique. If features are well distributed over the area of interest, it is possible to find the portion of the area geometrically that is covered and that is not covered. If desired, the entire area of interest, or a significant portion thereof, may be required to be occluded in order for an AR object to be rendered and displayed. In other words, occluding only a portion of the area of interest may be insufficient. The occlusion of the area of interest may be presumed to be, but may not necessarily be, caused by the 3D object. To reduce the amount of false detections, i.e., detections of occlusions of the area of interest that are not caused by the 3D object, the shape of the area of interest may have the same cross-section as the 3D object and if an area significantly different in shape than the area of interest is occluded, it may be determined that the occlusion is not caused by the 3D object. For example, if desired, specific shapes of areas of interest may be used so that only a specific object may be used to occlude the area of interest. Because the area of interest has a known location on the 2D surface, the detected occlusion of the area of interest provides information with respect to the location of the occluding object, which is presumed to be the 3D object.

Figure 5:
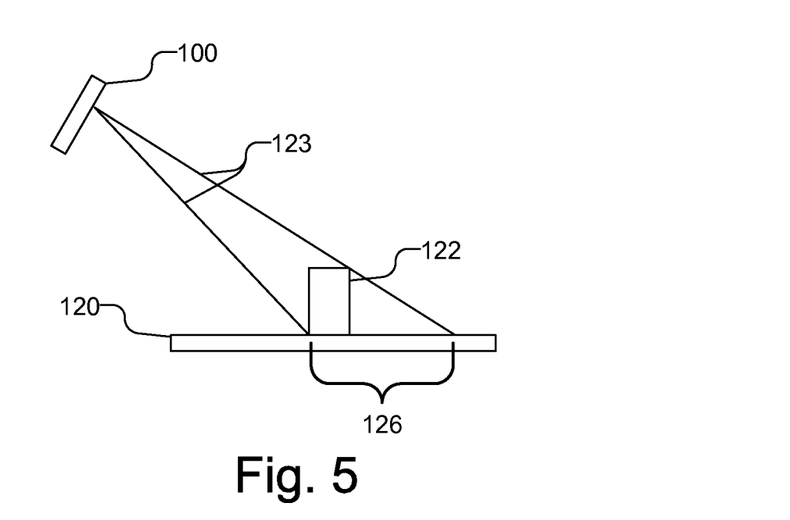
FIG. 5 illustrates a side view of the mobile platform capturing an image of the 2D surface and the 3D object and the 3D object occluding an area of the 2D surface based on the shape of the 3D object and the pose of the mobile platform with respect to the 2D surface.
Figure 6:
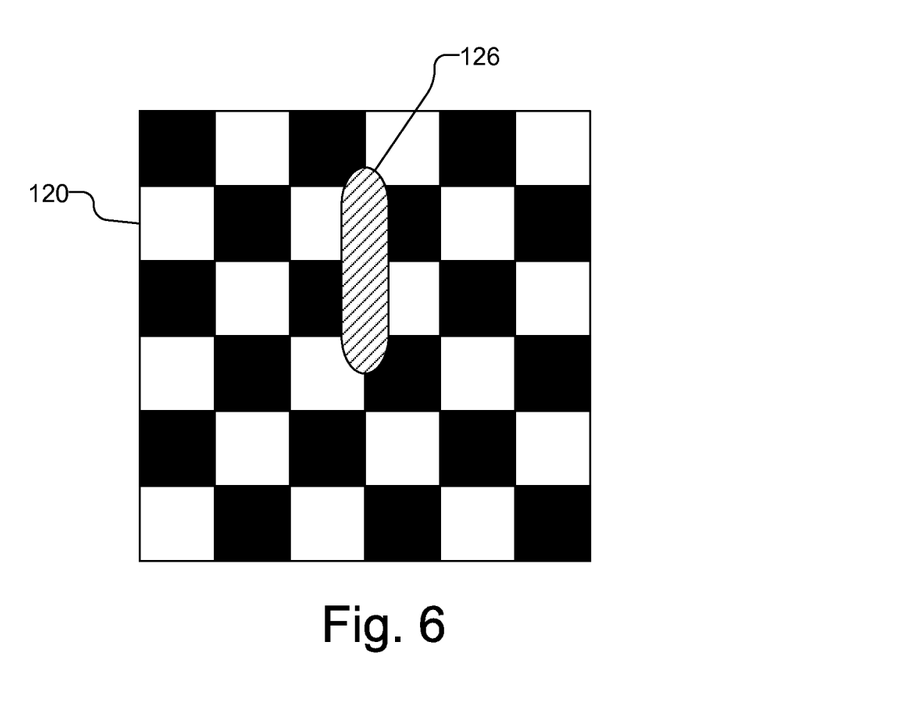
FIG. 6 illustrates a top plan view of the 2D checkered surface showing the area of the 2D surface occluded by the 3D object.

The shape of the 3D object is also determined (210). The shape of the 3D object may be predefined, i.e., the shape of the 3D object is provided by the user or is pre-programmed and stored in memory. The shape of the 3D object may also be determined based on the area of occlusion of the 2D surface. For example, FIG. 5 illustrates a side view of the mobile platform 100 capturing an image of the 2D surface 120 and the 3D object 122 and the 3D object 122 occluding an area 126 of the 2D surface 120. As illustrated by light rays 123 in FIG. 5, the 3D object 122 will occlude an area 126 of the 2D surface 120 that will vary based on the shape of the 3D object 122 as well as the pose (i.e., position and orientation) of the mobile platform 100 with respect to the surface 120. FIG. 6 illustrates a top plan view of the imaged checkered surface 120 along with the area 126 occluded by the 3D object shown with hatching. Thus, based on the known pose of the mobile platform 100 with respect to the 2D checkered surface 120, which is determined by tracking the 2D surface 120, along with the shape of the occluded area of the 2D checkered surface 120, the shape of the of the 3D object 122 may be calculated. As the mobile platform 100 moves with respect to and images the 2D checkered surface 120 and the 3D object 122 additional information about the shape of the 3D object 122 may be derived and stored in memory of the mobile platform 100.

Using the known location of the occluded area of interest and the determined shaped of the 3D object; the mobile platform 100 can indirectly track the 3D object. Thus, instead of directly detecting and tracking the actual 3D object, the occluded area of interest on the 2D surface is detected and tracked, greatly reducing computational requirements. Any desired action may then be performed with respect to the position of the 3D object on the 2D surface (212). For example, an augmented reality objects can then rendered and displayed with reference to the location of the occluded area of interest, where the AR object is rendered with respect to the determined shape of the 3D object (212). If desired, any other action may be triggered based on the determined location of the 3D object, such as performing discrete actions or switching on and off activities with or within the mobile platform. Real-world activities or actions may be controlled by the mobile platform, e.g., directly via radio frequency or light signals or through a wireless network. For example, real-world or simulated electrical circuits may be controlled by placing 3D objects (tactile icons) on a wiring plan. Switch points in a train station may be controlled by placing 3D objects onto a plan of the train station. Other examples include, e.g., influencing or controlling a flow simulation application by placing a 3D object as an obstacle in the flow, e.g., the obstacle may be a flow source such as a windmill ventilator. By placing a real ventilator into a scene and the flow simulation may be accordingly altered. Another example is adjusting a collision reaction, e.g., a virtual object may correctly react to a collision of a 3D object that is placed as an obstacle in a physics simulation application.

Figure 7:
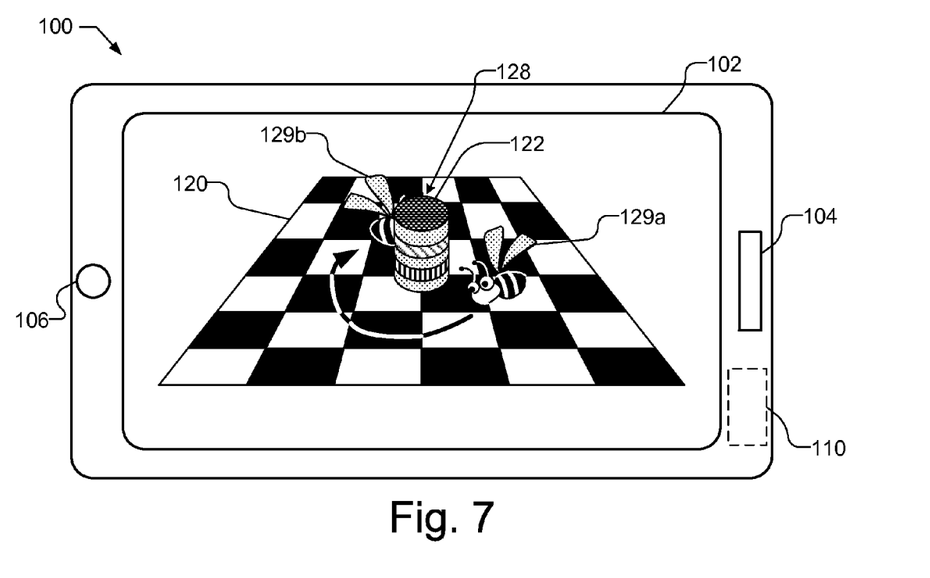
FIG. 7 illustrates a front side of the mobile platform held in landscape mode displaying a captured image of a 2D checkered surface and a 3D tubular object along with rendered and displayed graphical objects.

FIG. 7 illustrates a front side of the mobile platform 100 displaying a captured image of a 2D checkered surface and a 3D tubular object, similar to what is shown in FIG. 2, but also illustrates rendered and displayed graphical objects. For example, an AR object 128 is illustrated as being rendered with respect to the size of the 3D object 122 and displayed with reference to the occluded area of interest so that the 3D object 122 appears covered or painted by the AR object 128. Other AR objects 129a and 129b may be rendered with respect to the size of the 3D object 122, but are displayed not over but near the 3D object 122. In the present example, AR objects 129a and 129b appear as bees flying around the 3D object 122, disappearing behind the 3D object 122, as illustrated by AR object 129b.

Figure 8:
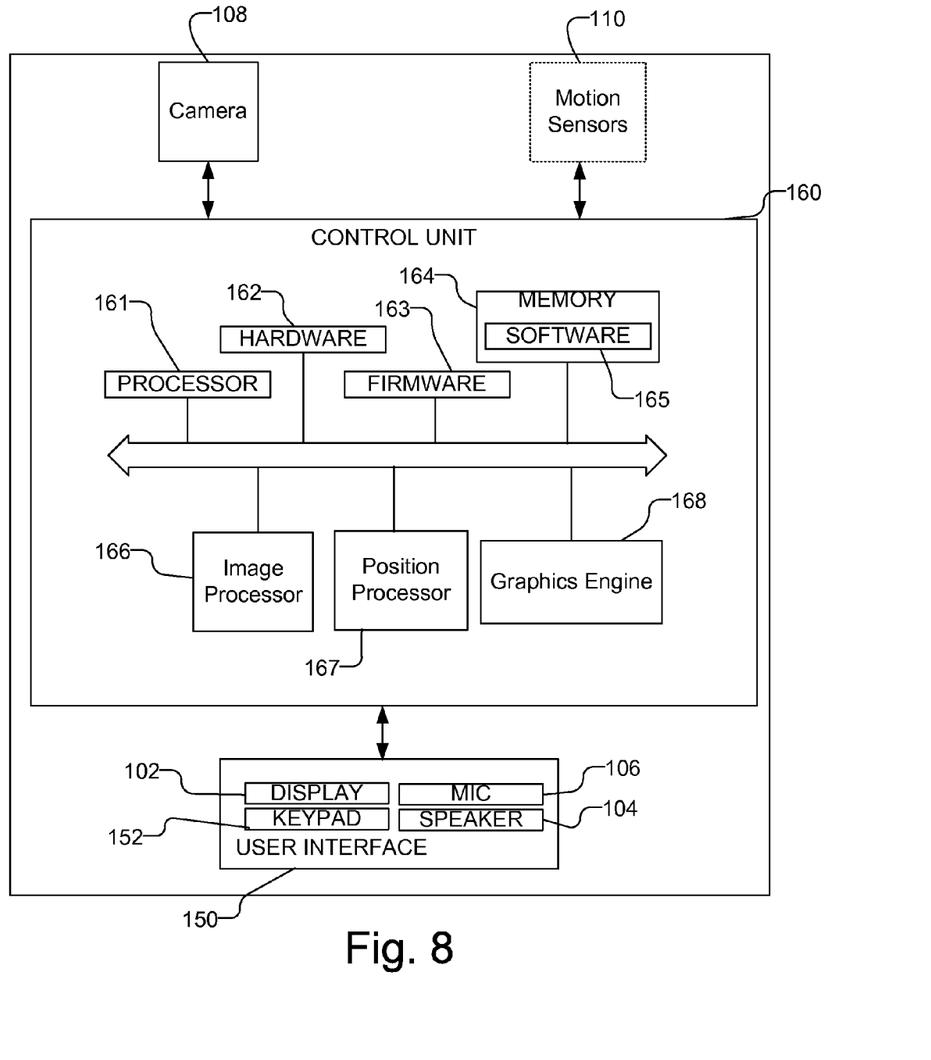
FIG. 8 is a block diagram of a mobile platform capable of detecting and tracking 3D objects using occlusions of a 2D surface.

FIG. 8 is a block diagram of a mobile platform 100 capable of detecting and tracking 3D objects using occlusions of a 2D surface. The mobile platform 100 includes a means for capturing an image of a 2D surface with a 3D object, such as camera 108, and may include motion sensors 110, such as accelerometers, gyroscopes, electronic compass, or other similar motion sensing elements. Mobile platform 100 may include other position determination methods such as object recognition using "computer vision" techniques. The mobile platform further includes user interface 150 that includes a means for displaying the image and AR objects, such as the display 102. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone. Of course, mobile platform 100 may include other elements unrelated to the present disclosure, such as a wireless transceiver.

The mobile platform 100 also includes a control unit 160 that is connected to and communicates with the camera 108, motion sensors 110 and user interface 150. The control unit 160 accepts and processes data from the camera 108 and motion sensors 110 and controls the display 102 in response. The control unit 160 may be provided by a processor 161 and associated memory 164, hardware 162, software 165, and firmware 163. The control unit 160 may include an image processor 166 for processing the images from the camera 108 to detect 2D surfaces and determine when areas of interest are occluded, and if desired to determine the shape of the occluded area. The control unit may also include a position processor 167 to determine and track the pose of the mobile platform 100 with respect to a detected 2D surface based on visual data from the camera 108 and/or data received form the motion sensors 110. The control unit 160 may further include a graphics engine 168, which may be, e.g., a gaming engine, to render desired AR objects with respect to the location of the occluded areas of interest and with respect to the shape of the determined 3D object. The graphics engine 168 may retrieve AR objects from storage (e.g., in memory 164). The image processor 166, position processor 167 and graphics engine are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The device includes means for detecting and tracking the 2D surface, which may include the image processor 166, position processor 167, as well as the motion sensors 110 if desired. The device further includes a means for detecting occlusion of an area of interest on the 2D surface, which may include the image processor 166. A means for determining the shape of the 3D object may include the graphics engine 168, which retrieves a predefined shape of the 3D object from memory 164. Additionally, a means for determining a shape of an area of occlusion of the 2D surface may be provided, e.g., by the image processor 166, and a means for determining the pose of the mobile platform with respect to the 2D surface may be provided, e.g., by the position processor 167, as well as the motion sensors 110 if desired, and the means for determining the shape of the 3D object may be, e.g., processor 161 using the shape of the area of occlusion of the 2D surface and the pose of the camera with respect to the 2D surface to determine the shape of the 3D object. A means for rendering a graphical object with reference to a location of the area of interest of the 2D surface, wherein the graphical object is rendered with respect to the shape of the 3D object may be the graphics engine 168.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. For example, the computer-readable medium including program code stored thereon may include program code to display an image captured by a camera of a 2D surface with a 3D object, program code to detect and track the 2D surface in the image, program code to detect an occlusion of a region assigned as an area of interest on the 2D surface, program code to determine a shape of the 3D object, and program code to render and display a graphical object with reference to a location of the area of interest on the 2D surface, wherein the graphical object is rendered with respect to the shape of the 3D object. The computer-readable medium may further include program code to determine a shape of an area of occlusion of the 2D surface, and program code to determine a pose of the camera with respect to the 2D surface, wherein the program code to determine the shape of the 3D object uses the shape of the area of occlusion of the 2D surface and the pose of the 2D surface to determine the shape of the 3D object. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

For example, the computer-readable medium including program code stored thereon may include program code to display an image captured by a camera of a 2D surface with a 3D object, program code to detect and track the 2D surface in the image, program code to detect an occlusion of a region assigned as an area of interest on the 2D surface, program code to determine a shape of the 3D object, and program code to render and display a graphical object with reference to a location of the area of interest on the 2D surface, wherein the graphical object is rendered with respect to the shape of the 3D object.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
capturing with a camera and displaying a series of images of a two-dimensional (2D) surface with a three-dimensional (3D) object;
detecting and tracking a position of the camera with respect to the 2D surface;
assigning a region of the 2D surface as an area of interest;
detecting an occlusion of the area of interest in the images of the 2D surface by the 3D object;
determining an area of the occlusion of the 2D surface by the 3D object;
determining a shape of the 3D object occluding the area of interest, the shape of the 3D object being determined based on the area of occlusion of the 2D surface and the position of the camera with respect to the 2D surface, wherein the shape of the 3D object is used to render a graphical object for representing the 3D object; and
rendering and displaying the graphical object representing the 3D object, the graphical object being rendered and displayed on the 2D surface with reference to the area of occlusion, wherein the graphical object is rendered with respect to the shape of the 3D object.

2. The method of claim 1, wherein the shape of the 3D object is predefined.

3. The method of claim 1, wherein determining the shape of the 3D object comprises determining a shape of the area of occlusion of the 2D surface, and using the shape of the area of occlusion of the 2D surface and the position of the camera with respect to the 2D surface to calculate the shape of the 3D object.

4. The method of claim 1, wherein the graphical object is rendered over the 3D object.

5. The method of claim 1, wherein the graphical object is rendered near the 3D object.

6. The method of claim 1, wherein multiple regions of the 2D surface are assigned as areas of interest.

7. The method of claim 1, wherein a location of the area of interest is predefined.

8. The method of claim 1, wherein the series of images is captured and displayed by a mobile platform.

9. A mobile platform comprising:
a camera;
a processor connected to the camera;
memory connected to the processor;
a display connected to the memory; and
software held in the memory and run in the processor to cause the processor to:
display on the display a series of images captured by the camera of a two-dimensional (2D) surface with a three-dimensional (3D) object;
detect and track a position of the mobile platform with respect to the 2D surface in the images;
detect an occlusion of a region by the 3D object, wherein the region is assigned as an area of interest on the 2D surface;
determine an area of the occlusion of the 2D surface by the 3D object;
determine a shape of the 3D object occluding the area of interest based on the area of occlusion of the 2D surface and the position of the camera with respect to the 2D surface, wherein the shape of the 3D object is used to render a graphical object for representing the 3D object; and
render and display on the display the graphical object representing the 3D object, the graphical object being rendered and displayed on the 2D surface with reference to the area of occlusion, wherein the graphical object is rendered with respect to the shape of the 3D object.

10. The mobile platform of claim 9, wherein the shape of the 3D object is predefined.

11. The mobile platform of claim 9, wherein determining the shape of the 3D object comprises determining a shape of the area of occlusion of the 2D surface, and using the shape of the area of occlusion of the 2D surface and the position of the camera with respect to the 2D surface to calculate the shape of the 3D object.

12. The mobile platform of claim 9, wherein the graphical object is rendered over the 3D object in the display.

13. The mobile platform of claim 9, wherein the graphical object is rendered near the 3D object in the display.

14. The mobile platform of claim 9, wherein multiple regions of the 2D surface are assigned as areas of interest.

15. The mobile platform of claim 9, wherein a location of the area of interest is predefined.

16. The mobile platform of claim 9, further comprising motion sensors, wherein the software causes the processor to detect and track the 2D surface in the images using data from the motion sensors.

17. The mobile platform of claim 9, wherein the software causes the processor to detect and track the 2D surface using additional images from the camera.

18. A system comprising:
means for capturing images of a two-dimensional (2D) surface with a three-dimensional (3D) object;
means for displaying the images;
means for detecting and tracking a position of the means for capturing images with respect to the 2D surface;
means for detecting occlusion of a region by the 3D object, wherein the region is assigned as an area of interest on the 2D surface;
means for determining an area of the occlusion of the 2D surface by the 3D object;
means for determining a shape of the 3D object occluding the area of interest, the shape of the 3D object being determined based on the area of occlusion of the 2D surface and the position of the means for capturing images with respect to the 2D surface, wherein the shape of the 3D object is used to render a graphical object for representing the 3D object; and means for rendering and displaying the graphical object representing the 3D object, the graphical object being rendered and displayed on the 2D surface with reference to the area of occlusion, wherein the graphical object is rendered with respect to the shape of the 3D object.

19. The system of claim 18, wherein the shape of the 3D object is predefined.

20. The system of claim 18, wherein determining the shape of the 3D object comprises determining a shape of the area of occlusion of the 2D surface, and using the shape of the area of occlusion of the 2D surface and the position of the means for capturing images with respect to the 2D surface to determine the shape of the 3D object.

21. The system of claim 18, wherein the graphical object is rendered over the 3D object.

22. The system of claim 18, wherein the graphical object is rendered near the 3D object.

23. The system of claim 18, wherein multiple regions of the 2D surface are assigned as areas of interest.

24. The system of claim 18, wherein a location of the area of interest is predefined.

25. A non-transitory computer-readable medium including program code stored thereon, comprising:

program code to display images captured by a camera of a two-dimensional (2D) surface with a three-dimensional (3D) object;

program code to detect and track a position of the camera with respect to the 2D surface in the images;

program code to detect an occlusion of a region by the 3D object, wherein the region is assigned as an area of interest on the 2D surface;

program code to determine an area of the occlusion of the 2D surface by the 3D object;

program code to determine a shape of the 3D object occluding the area of interest, the shape of the 3D object being determined based on the area of occlusion of the 2D surface and the position of the means for capturing images with respect to the 2D surface, wherein the shape of the 3D object is used to render a graphical object for representing the 3D object; and program code to render and display the graphical object representing the 3D object, the graphical object being rendered and displayed on the 2D surface with reference to the area of occlusion, wherein the graphical object is rendered with respect to the shape of the 3D object.

26. The non-transitory computer-readable medium of claim 25, wherein the shape of the 3D object is predefined.

27. The non-transitory computer-readable medium of claim 25, wherein determining the shape of the 3D object comprises determining a shape of the area of occlusion of the 2D surface, and using the shape of the area of occlusion of the 2D surface and the position of the camera with respect to the 2D surface to determine the shape of the 3D object.

28. The non-transitory The computer-readable medium of claim 25, wherein the graphical object is rendered over the 3D object in the display.

29. The non-transitory computer-readable medium of claim 25, wherein the graphical object is rendered near the 3D object in the display.

30. The non-transitory computer-readable medium of claim 25, wherein multiple regions of the 2D surface are assigned as areas of interest.

31. The non-transitory computer-readable medium of claim 25, wherein a location of the area of interest is predefined.

* * * * *

UNITED STATES PATENT AND TRADEMARK OFFICE
CERTIFICATE OF CORRECTION

PATENT NO. : 10,109,065 B2
APPLICATION NO. : 13/013535
DATED : October 23, 2018
INVENTOR(S) : Michael Gervautz et al.

Page 1 of 1

It is certified that error appears in the above-identified patent and that said Letters Patent is hereby corrected as shown below:

In the Claims

Column 10, Claim 28, Line 23:
Delete "non-transitory The" and insert -- non-transitory --, therefor.

Signed and Sealed this
Seventh Day of May, 2019

Andrei Iancu
*Director of the United States Patent and Trademark Office*